United States Patent [19]

Beard

[11] Patent Number: 4,860,692
[45] Date of Patent: Aug. 29, 1989

[54] ONE HANDED CURRYCOMB APPARATUS AND METHOD

[76] Inventor: Larry R. Beard, 16000 Decker Lake Rd., Austin, Tex. 78724

[21] Appl. No.: 273,552

[22] Filed: Nov. 21, 1988

[51] Int. Cl.$^4$ ............................................. A01K 13/00
[52] U.S. Cl. ........................................ 119/88; 132/119
[58] Field of Search .......................... 119/88; 132/119; 15/104.5, 104.52, 104.53, 104.54, 185, 104.51

[56] References Cited

U.S. PATENT DOCUMENTS

| | | | |
|---|---|---|---|
| 276,817 | 5/1883 | Hermundson | 119/88 |
| 591,074 | 10/1897 | Day | 119/88 |
| 995,443 | 6/1911 | Danner | 119/88 |
| 1,050,103 | 1/1913 | Clemens | 119/88 |
| 1,135,246 | 4/1915 | Anderson | 119/88 |
| 1,180,781 | 4/1916 | McKeown | 119/88 |
| 1,235,138 | 7/1917 | Harris | 119/88 |
| 1,689,209 | 10/1928 | Majewski | 119/88 |
| 4,574,416 | 3/1986 | Stewart et al. | 19/88 |

FOREIGN PATENT DOCUMENTS 84743  10/1935  Sweden ................................. 119/88

Primary Examiner—Paul J. Hirsch
Attorney, Agent, or Firm—J. Nevin Shaffer, Jr.

[57] ABSTRACT

A one handed currycomb apparatus and method comprised of a base plate with blades with teeth and a handle connected by means of a shank. The currycomb contains a cleaning mechanism comprised of a cleaning plate, actuating lever, and biasing spring. The cleaning plate is connected at a pivoting end to a pivoting pin and is normally biased in a retracted position to the bottom side of the base plate. The cleaning plate contains slots through which the teeth are exposed. By means of the actuating lever, the user can, with either his right or left hand, utilize his index finger to rotate the cleaning plate away from the retracted position to an extended position. When this is done, the slots of the cleaning plate force collected hair, dirt, debris, and the like, from the teeth. Release of the actuating lever results in the return of the cleaning plate to the retracted position and the readying of the device for further use.

8 Claims, 2 Drawing Sheets

ONE HANDED CURRYCOMB APPARATUS AND METHOD

BACKGROUND OF THE INVENTION

This invention is related to grooming devices and more particularly to a one handed currycomb apparatus and method having a cleaning mechanism that enables the groomer to easily and quickly remove hair and dirt from the teeth of the currycomb.

Currycombs are used for grooming or currying horses or other animals and generally include a base, a number of rows of rigid teeth or serrated ridges extending from the base, and a handle. A groomer holds the handle and draws the teeth against an animal's coat to remove dirt and dead or loose hair. As the animal is curried, hair and dirt are caught by, and collect, on the teeth or serrations. This hair and dirt eventually collects to the point where it diminishes the effectiveness of the currycomb and therefore must be removed from time to time as grooming progresses.

Early currycombs had to be cleaned manually, the groomer either striking the currycomb against a solid object to jar the collected hair and dirt loose or using some instrument to work the collected hair from between the currycomb teeth. Other currycombs have included various mechanisms for removing the collected hair and dirt. Currycomb cleaning mechanisms known in the art generally include a cleaning plate and an actuating mechanism for manipulating the cleaning plate. The cleaning plates generally have slots through which the comb teeth may pass so that the plate may fit over the teeth with portions of the plate extending transversely between the comb teeth. The cleaning plate is maintained normally in a retracted position over the teeth. Cleaning is accomplished by working the actuating mechanism to move the cleaning plate away from the base, hair and dirt being loosened or ejected as the cleaning plate slides down the projecting teeth.

U.S. Pat. No. 309,484 to Lawrence illustrates a self-cleaning currycomb having a handle positioned directly above the comb base and having a cleaning plate actuating mechanism incorporated into the comb handle. The slotted cleaning plate is actuated either by pressing downward on the handle with the teeth resting against a solid surface or by gripping the handle firmly.

However, the actuating mechanism taught by Lawrence interfered with the normal use of the comb due to the positioning of the mechanism and its manner of operation. If too much downward force is applied during grooming, the cleaning plate will extend and effectively cover the comb teeth. Thus, the downward force that may be applied during grooming is restricted by the cleaning mechanism.

U.S. Pat. No. 654,218 to Beldin also teaches a currycomb having a cleaning mechanism. Unlike the Lawrence comb, the actuating mechanism according to the Beldin patent is entirely separate from the handle. The actuating mechanism in Beldin is, however, still positioned directly over the comb base and requires that the groomer hold the handle with one hand and use the second hand to press an actuating bar. Similarly, both U.S. Pat. No. 819,790 to Neste and 1,095,515 to Noble show a currycomb with a cleaning plate actuated by a lever removed from the comb handle and mounted directly above the comb base. As with the Beldin device, these cleaning mechanisms require two-handed operation.

U.S. Pat. No. 995,443 to Danner discloses a spring-loaded cleaning plate that is extended only by the force of a spring and not by a force directly applied by the groomer. The extending springs may be released by a trigger mechanism positioned directly above the comb base. Although the cleaning plate may be released or triggered without the groomer having to substantially change his grip on the handle, the cleaning plate must be retracted or re-cocked with the groomer's free hand before grooming may be resumed. Thus, the self-cleaning currycomb shown by Danner also requires two-handed operation. The self-cleaning currycomb disclosed in U.S. Pat. No. 1,135,246 to Anderson includes a cleaning plate pivoted to the currycomb base or frame at one end and pivotally connected to an actuating rod at the other end. The actuating rod extends above the frame and handle and is biased upward by a spring to keep the cleaning plate in the retracted position. To extend the cleaning plate and thereby remove collected hair and dirt from the comb teeth, the groomer must press the actuating rod downward. Since the actuating rod is connected to the end of the cleaning plate remote from the pivoting connection to the frame, the rod must be moved a relatively long distance in order to move the cleaning plate past each row of teeth on the comb to eject collected hair and dirt. Due the length of travel of the actuating rod and its positioning, the cleaning mechanism disclosed by Anderson requires two-handed operation or at least requires that the groomer change his grip substantially in order to reach up to depress the actuating rod. Additionally, this device does not appear to clean the row of teeth furthest away from the handle.

Importantly, none of the currycomb devices known in the art protect the actuating mechanism springs, and the like, from dirt and debris. As a result, all of them are vulnerable to deteriorating operating capabilities when used over time.

A drawback to the currycombs known in the art, therefore, is that they require two hands to operate effectively. Thus there is a need in the art for providing a currycomb having a cleaning mechanism that can be actuated quickly and easily with one hand and thereby generally reduce the time and effort required to remove the hair and dirt that collects between the teeth of the comb during grooming.

Another object of the invention is to provide a currycomb having a cleaning mechanism that does not interfere with the normal operation of the currycomb and one that is protected from dirt and debris.

SHORT STATEMENT OF THE INVENTION

Accordingly, the one handed currycomb of the present invention includes a base plate or frame, at least one row of teeth mounted on one side of the base plate, and a handle connected to the base plate by a shank. The handle is preferably positioned beyond one edge of the base plate and above the side of the base plate opposite the side on which the teeth are mounted.

The currycomb of the present invention also includes a unique cleaning mechanism adapted for removing hair and dirt that collects between the rows of teeth during grooming. The cleaning mechanism includes a slotted cleaning or stripper plate, a trigger or actuating lever, and an actuating lever biasing spring.

In the preferred form of the invention, the cleaning plate is pivotally connected at one end to the shank, with the opposite end of the cleaning plate being free. In other forms of the invention, the cleaning plate may be pivotally connected to the handle rather than the shank. However, regardless of whether the cleaning plate is connected to the shank or the handle, the plate is adapted for movement pivotally between a retracted position generally adjacent the base plate, and an extended position away from the base plate. In the retracted position, the slotted cleaning plate fits over the teeth of the comb such that the teeth extend through slots in the cleaning plate. In the extended position, the cleaning plate is pivoted downward away from the base plate to a point where none of the teeth extend through any of the slots in the cleaning plate. As the cleaning plate is pivoted from the retracted position to the extended position, portions of the plate slide past all of the teeth to push away any collected hair and dirt.

The actuating lever is rigidly connected to the cleaning plate and extends from the pivotally connected end of the cleaning plate beyond the shank to a position generally underneath the handle. In this position underneath the handle, the actuating lever may be used to pivot the cleaning plate from its retracted position to its extended position by moving the actuating lever upward closer to the handle. Conversely, by moving the actuating lever away from the handle, the cleaning plate may be pivoted from the extended position to the retracted position.

A biasing spring is positioned for biasing the actuating lever away from the handle so as to maintain the cleaning plate normally in its retracted position. In the preferred form of the invention, the biasing spring acts between the shank and the actuating lever to apply the desired biasing force to the lever. Also, importantly, the biasing spring is preferably contained substantially within the shank so that it is not exposed to hair or dirt that would interfere with its biasing action.

Since the actuating lever is positioned below the handle, the groomer need not change his grip on the handle to clean the currycomb and also need not use his other hand. Pursuant to the invention, a groomer can remove hair and dirt collected between the currycomb teeth simply by moving one or two fingers from directly around the handle to the actuating lever and then pulling the lever from its biased position toward the handle. Also, since the actuating lever preferably extends only a short distance on the opposite side of the pivot from the cleaning plate, the amount of movement of the actuating lever required to pivot the entire cleaning plate beyond the level of all of the teeth is relatively small. Furthermore, the positioning of the cleaning mechanism and its method of operation prevents unintended extension of the cleaning plate during grooming and the resultant interference with normal grooming.

These and other objects, advantages, and features of the invention will be apparent from the following description of the preferred embodiments, considered along with the accompanying drawings.

DETAILED DESCRIPTION OF THE PREFERRED EMBODIMENT

The preferred embodiment of the present invention is illustrated by way of example in FIGS. 1–5.

Figure 1:
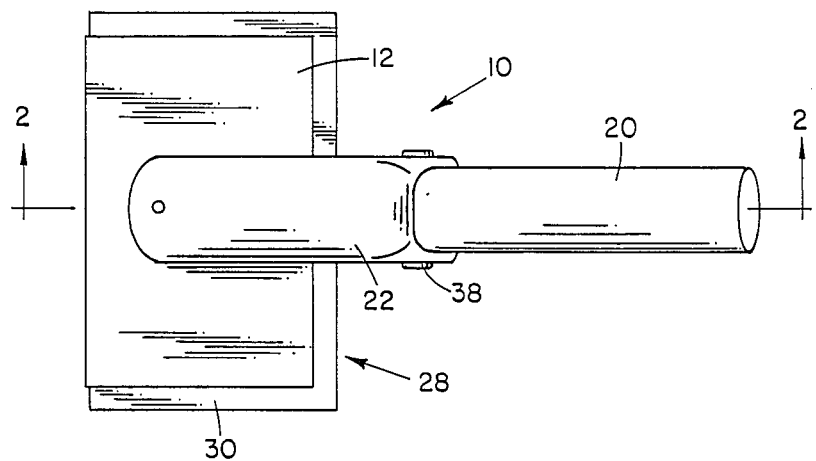
FIG. 1 is a view in perspective of a currycomb embodying the principles of the invention.
Figure 2:
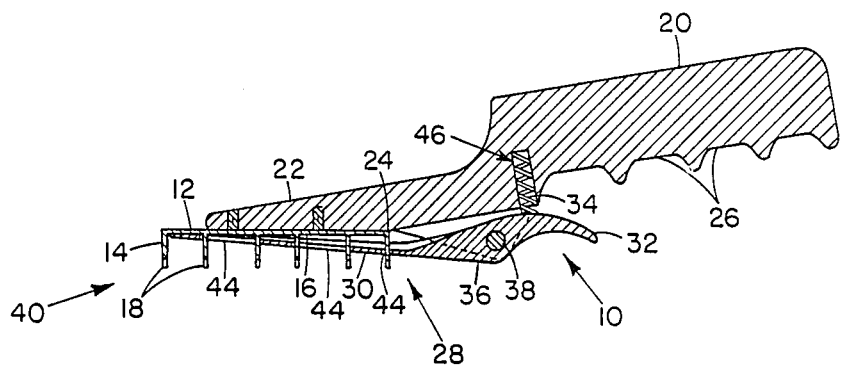
FIG. 2 is a view in section taken along line 2—2 in FIG. 1.
Figure 3:
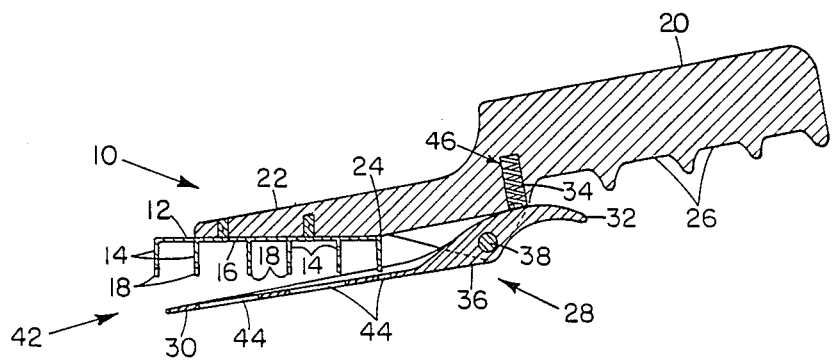
FIG. 3 is a view in section similar to that shown in FIG. 2, but with the cleaning plate shown in the extended position.
Figure 4:
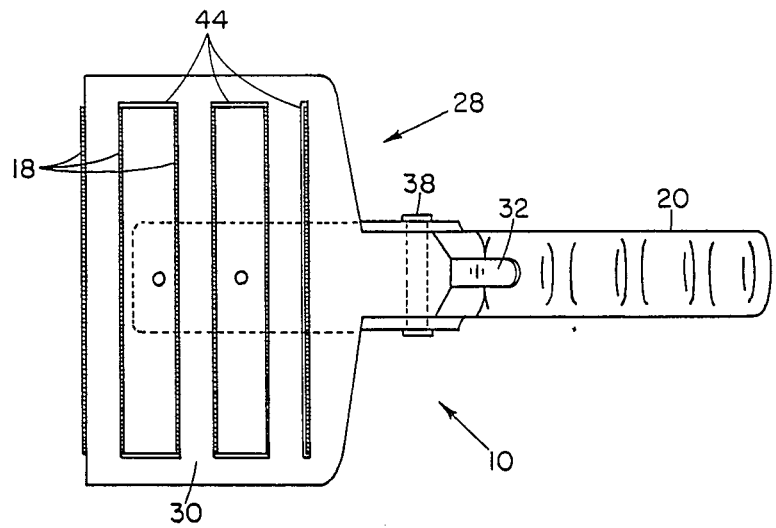
FIG. 4 is a bottom view of the currycomb shown in FIG. 1.
Figure 5A:
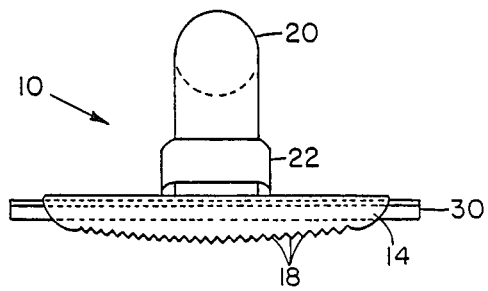
FIG. 5a and 5b are front and rear views, respectively.
Figure 5B:
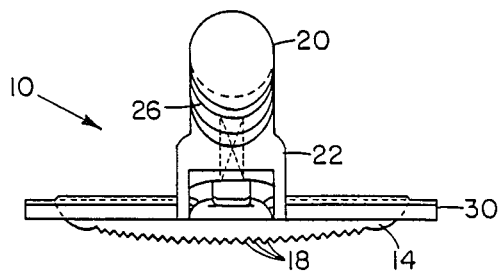

As illustrated in FIG. 1, a one handed currycomb 10 embodying the principles of the invention includes a generally planar base plate 12 on which are mounted several rows of blades 14. The blades 14 extend from a bottom side 16 of the base plate 12 and are serrated to form teeth 18. The currycomb 10 also includes a handle 20 that is connected to the base plate 12 by a shank 22. As best illustrated in FIGS. 2 and 3, the handle 20 is positioned by the shank 22 beyond one edge 24 of the base plate 12 and spaced somewhat above the plane of the base plate 12. The spacing above the plane of the base plate 12 provides room for gripping the handle 20 during use without interfering with the action of the blades 14 and teeth 18 on the particular animal's coat (not shown). Handle 20 has a plurality of finger gripping indentations 26 that assist the user in grasping handle 20.

In the preferred form of the invention, the handle 20 and shank 22 are integrally formed from a suitable plastic. Also in the preferred form, the base plate 12, blades 14 and teeth 18 are all made of a rigid material, preferably a suitable metal and/or hard plastic.

The currycomb 10, pursuant to the invention, also includes a cleaning mechanism, generally indicated by reference numeral 28 in the figures, for removing hair and dirt from between the blades 14 and teeth 18. The cleaning mechanism 28 includes a cleaning plate 30, an actuating lever 32, and a biasing spring 34.

In the illustrated form of the invention, the cleaning plate 30 is pivotally connected at a pivoting end 36 to the shank 22 by a pivot pin 38. The cleaning plate 30 is also movable pivotally between a retracted position 40 shown in FIG. 2 and an extended position 42 shown in FIG. 3. In the retracted position 40 (FIG. 2), the cleaning plate 30 is positioned generally adjacent the bottom side 16 of the base plate 12 with the blades 14 and teeth 18 extending through slots 44 in the cleaning plate 30. These slots 44, in the cleaning plate 30, are shown best in FIG. 4. In the extended position 42 (FIG. 3), the cleaning plate 30 is pivoted away from the base plate 12 so that none of the blades 14 extend through the slots 44. As the cleaning plate 30 is pivoted from the retracted position 40 (FIG. 2) to the extended position 42 (FIG. 3), the cleaning plate 30 slides along and past all the blades 14 and teeth 18 to remove hair or dirt (not shown) that has collected on the blades 14 and teeth 18 during grooming.

Referring particularly to FIGS. 2 and 3, the cleaning mechanism 28 also includes a trigger or actuating lever 32 that is rigidly connected to the cleaning plate 30, and by which the cleaning plate 30 may easily be pivoted from one position to another. The actuating lever 32 extends rearwardly from the pivot end 36 of the cleaning plate 30 beyond the shank 22 and generally to a position beneath the handle 20. By moving or pivoting the actuating lever 32 toward the handle 20 and shank 22, the cleaning plate 30 pivots from the retracted position 40 to the extended position 42. Conversely, moving the actuating lever 32 away from the handle 20 pivots the cleaning plate 30 toward the retracted position 40.

Since the cleaning plate 30 must be maintained in the retracted position 40 to expose the blades 14 and teeth 18 for grooming, the biasing spring 34 is positioned to bias the actuating lever 32 away from the shank 22 and handle 20 and thereby maintain cleaning plate 30 normally in the retracted position 40 (FIG. 2). In the illustrated form of the invention, the biasing spring 34 operates between the shank 22 and the actuating lever 32. However, in other forms of the invention, the biasing spring 34 may operate between the handle 20 and the lever 32. Also, in the preferred form of the invention, the biasing spring 34 is substantially enclosed in a cavity 46 within the body of the shank 22. This cavity 46 helps to isolate the spring 34 from hair and/or dirt loosened during grooming that might otherwise reduce the effectiveness of currycomb 10.

In operation, a user grasps currycomb 10 by means of handle 20 and places his fingers within finger gripping indentations 26. Having firmly grasped handle 20, the user will draw the currycomb 10 across the animal to be curried in a manner well known. While the currycomb 10 is being utilized, blades 14 and associated teeth 18 rake through the animal's coat and collect loose hair, dirt, and debris. Once this debris accumulates in sufficient quantities, the user simply releases handle 20 with the index finger of this right or left hand, and depresses actuating lever 32. That is, the user draws actuating lever 32 toward handle 20. By drawing actuating lever 32 toward handle 20, cleaning mechanism 22, comprised of cleaning plate 30 and biasing spring 34, is pivoted on pivoting pin 38 at its pivoting end 36. As a result, cleaning plate 30 is forceably moved from retracted position 40 to extended position 42. This movement from retracted position 40 to extended position 42, causes slots 44 to be drawn over and around teeth 18 of blades 14. When this occurs, the accumulated debris is forced from teeth 18 and ejected from the currycomb 10. The user then simply releases acututing lever 32 and, because of biasing spring 34, cleaning plate 30 is forceably drawn from extended position 42 to retracted position 40.

Cavity 46 is provided to shield biasing spring 34 from exposure to the rejected debris. As a result, biasing spring 34 is operable for extended periods of time without the need of any cleaning maintenance whatsoever.

While the present invention has been disclosed in connection with the preferred embodiment thereof, it should be understood that there may be other embodiments which fall within the spirit and scope of the invention as defined by the following claims.

What is claimed is:

1. A currycomb comprising:
   A. a base plate with an upper and bottom side;
   B. at least one row of teeth extending from said base plate;
   C. a handle rigidly connected to said base plate by a shank, said shank being of sufficient length and configuration to position said handle beyond one edge of said base plate and spaced somewhat above said upper side thereof;
   D. a slotted cleaning plate pivotally connected at one end to said shank, said slotted cleaning plate being movable pivotally between a retracted position generally adjacent said bottom side of said base plate with each of said teeth extending from said bottom side of said base plate through slots in said cleaning plate, and an extended position in which said cleaning plate is spaced from said base plate sufficiently so that none of said teeth extend through said slotted cleaning plate;
   E. an actuating lever rigidly connected to said cleaning plate, said actuating lever extending from said pivotally connected end of said cleaning plate beyond said shank and beneath said handle, for pivoting said cleaning plate between said retracted position and said extended position; and
   F. a biasing means for biasing said actuating lever away from said handle such that said cleaning plate is maintained normally in said retracted position, whereby said actuating lever may be pulled by a user, using one hand only, toward said handle causing said cleaning plate to pivot from said retracted position to said extended position thereby ejecting debris from between said teeth, and whereby when said actuating lever is released by said user, said biasing means moves said actuating lever away from said handle thereby returning said cleaning plate to said retracted position so that grooming may be resumed.

2. The currycomb of claim 1 wherein said biasing means comprises a spring acting between said shank and said actuating lever.

3. The currycomb of claim 2 wherein said shank includes a cavity for substantially housing said spring, so that said spring is protected from said debris.

4. The currycomb of claim 1 wherein said shank and said handle are integrally formed from a suitable plastic material.

5. A currycomb method comprising the steps of:
   A. providing a base plate with an upper and bottom side;
   B. attaching at least one row of teeth extending from said base plate;
   C. connecting a handle to said base plate by a shank, said shank being of sufficient length and configuration to position said handle beyond one edge of said base plate and spaced somewhat above said upper side thereof;
   D. providing a slotted cleaning plate pivotally connected at one end to said shank, said slotted cleaning plate being movable pivotally between a retracted position generally adjacent said bottom side of said base plate with each of said teeth extending from said bottom side of said base plate through slots in said cleaning plate, and an extended position in which said cleaning plate is spaced from said base plate sufficiently so that none of said teeth extend through said slotted cleaning plate;
   E. connecting an actuating lever to said cleaning plate, said actuating lever extending from said pivotally connected end of said cleaning plate beyond said shank and beneath said handle, for pivoting said cleaning plate between said retracted position and said extended position;
   F. providing a biasing means for biasing said actuating lever away from said handle such that said cleaning plate is maintained normally in said retracted position, whereby said actuating lever may be pulled by a user, using one hand only, toward said handle causing said cleaning plate to pivot from said retracted position to said extended position thereby ejecting debris from between said teeth, and whereby, when said actuating lever is released by said user, said biasing means moves said actuating lever away from said handle thereby returning said cleaning plate to said retracted position; and G. resuming grooming.

6. The method of claim 5 wherein the step of providing said biasing means comprises the step of connecting a spring acting between said shank and said actuating lever.

7. The method of claim 6 further comprising the step of providing a cavity for substantially housing said spring, so that said spring is protected from said debris.

8. The method of claim 7 further comprising the step of forming said shank and said handle are integrally from a suitable plastic material.

* * * * *